United States Patent [19]

Banks

[11] 4,359,797
[45] Nov. 23, 1982

[54] PLUG AND BALL INJECTOR VALVE

[75] Inventor: James W. Banks, Tulsa, Okla.

[73] Assignee: Geosource Inc., Houston, Tex.

[21] Appl. No.: 257,371

[22] Filed: Apr. 24, 1981

[51] Int. Cl.³ .................................................. B08B 9/04
[52] U.S. Cl. ............................... 15/104.06 A; 137/268
[58] Field of Search ............... 15/104.06 R, 104.06 A, 15/3.5, 3.51; 137/268

[56] References Cited

U.S. PATENT DOCUMENTS

| | | | |
|---|---|---|---|
| 2,977,617 | 4/1961 | Willis | 15/104.06 |
| 3,000,028 | 9/1961 | Buie et al. | 15/104.06 |
| 3,063,079 | 11/1962 | Bergman et al. | 15/104.06 |
| 3,063,080 | 11/1962 | Bergman et al. | 15/104.06 |
| 3,146,477 | 9/1964 | Bergman et al. | 15/104.06 |
| 3,848,621 | 11/1974 | Dickenson et al. | 137/268 |
| 4,044,418 | 8/1977 | Ishii et al. | 15/104.06 |

FOREIGN PATENT DOCUMENTS 309344 5/1979 United Kingdom .

Primary Examiner—Edward L. Roberts
Attorney, Agent, or Firm—Arnold, White & Durkee

[57] ABSTRACT

A plug and ball injector valve is provided which utilizes seals mounted in standard grooves and an arrangement of pressure balancing cavity areas brought into communication with the seals to balance the fluid pressure across the seals before such seals are exposed to unpressurized ports or passageways. A drain port is arranged in the vicinity of the loading port of the valve to limit spillage and leakage of the line fluid passing through the valve.

18 Claims, 5 Drawing Figures

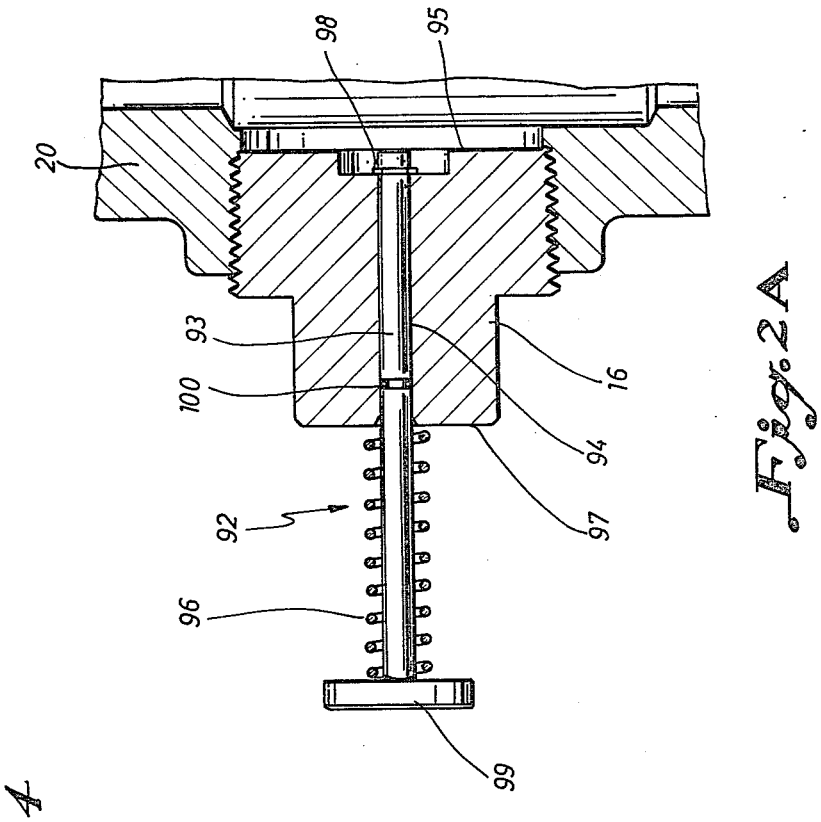
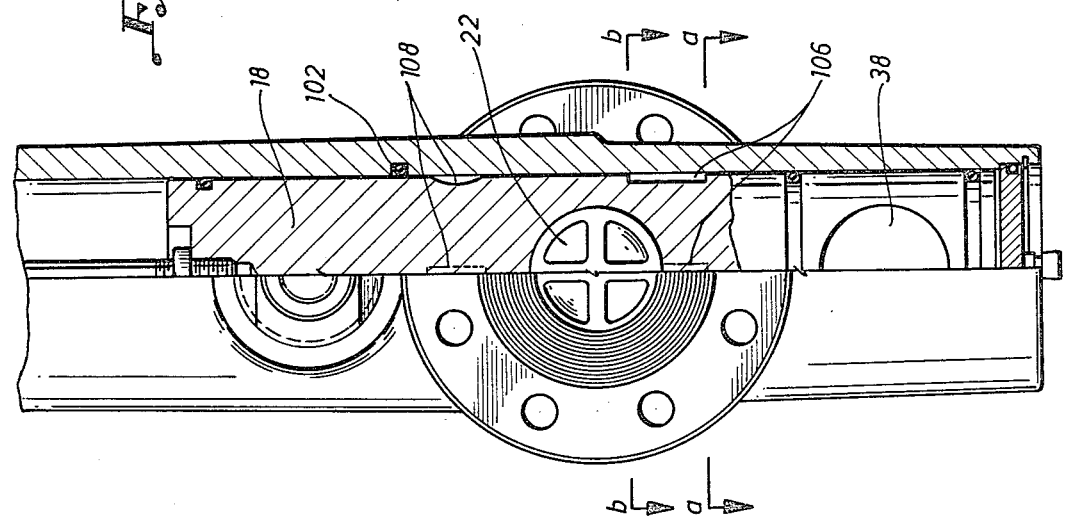

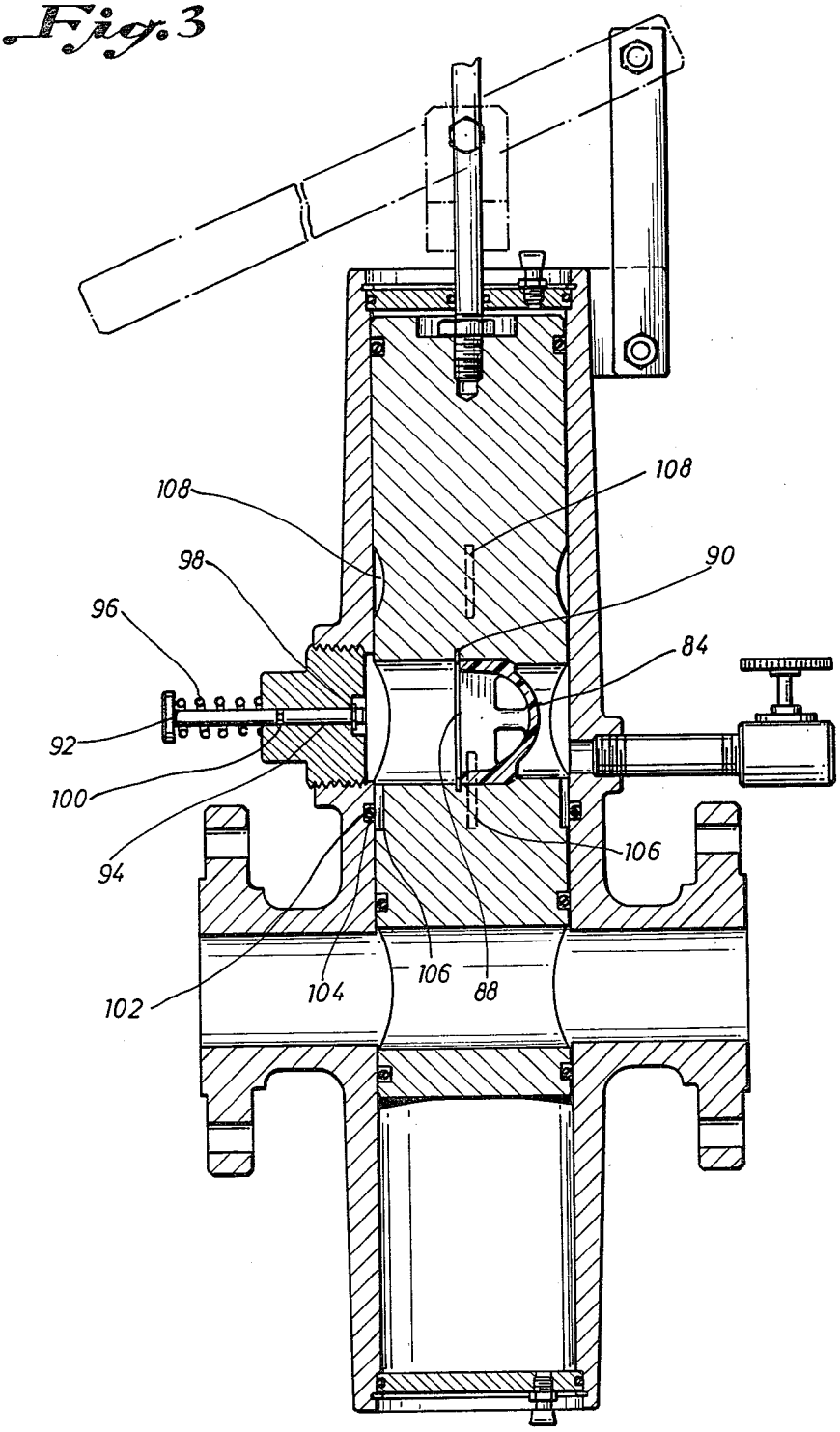

PLUG AND BALL INJECTOR VALVE

BACKGROUND OF THE INVENTION

This invention relates to pressurized fluid flow lines and more particularly to apparatus for the injection or retrieval of plugs or balls, such as solid rubber spheres or cylinder wax slugs, which items are introduced into a pressurized fluid line for such purposes as cleaning out pockets of liquid or separating different products within the line.

In pressurized fluid lines, such as gas and oil pipelines, clogging or restrictions may occur within the pipeline as a result of deposits and the like, thus affecting the flow through the line. In order to clean out such deposits or pockets of foreign matter, it is conventional practice to insert balls or plugs into the line which are driven forward by the line fluid pressure and push the deposits or pockets of foreign material forward in the line to a trap area or reservoir.

Further, it is conventional to use balls or plugs to separate different products within a line or to distinguish quantities of products within a line.

It is desirable that the flow of pressurized fluid not be interrupted or restricted or, at least, that any interruption be minimized. Consequently, it is desirable that the line flow not be stopped or shut off during the process of introducing or retrieving a ball or plug. Inasmuch as the fluid within a line may be under significant pressure, leakage and spillage of the fluid product will often occur during the injection or retrieval operation. As illustrated in U.S. Pat. No. 3,146,477, seals may be arranged within the injection valve housing to limit seepage directly from the pressurized line fluid when the valve is in a ball loading position or in a position for injecting the ball into the fluid line. However, fluid will find its way into the loading chamber area during operation of the valve and spillage of this trapped fluid may thus occur as balls or plugs are loaded or unloaded even though the pressurized line fluid is sealed off during that procedure.

The seals utilized in an injector valve may be subjected to the high pressure of the fluid line as well as to unpressurized port or chamber areas. The pressure differentials to which the seals are exposed can cause the seals to be pinched and cut during the operation of the valve as they are urged toward low pressure areas. Occasionally, such seals may be caused to blowout when sudden exposure to open and unpressurized chamber or port areas occur.

The wear to which the seals of an injector valve are subjected can result in leakage of fluid directly from the pressurized fluid line through the valve and increased maintenance and attention for the valve. Prior injector valve devices have tried to overcome the problem of seal wear and blowout potential by use of dovetail type grooves for containing the seals in the valve housing and piston. The dovetail groove formation tends to structurally retain the seal in its position within the groove despite the pressure differential acting across the seal. However, such grooves are more expensive and difficult to machine into the valve components.

SUMMARY OF THE INVENTION

The above-noted and other drawbacks of the prior art are believed to be overcome by the injector valve of this invention which is of relatively simple construction and which features the capability of introducing and retrieving plugs or balls from a pressurized fluid line with minimal or no spillage of the pressurized fluid and which reduces the effects of the pressure differentials acting across the seals used in the valve. The construction and machining of the components of the injector valve of this invention are simplified by use of pressure balancing cavity areas within the valve which eliminate the need for specially formed seal or O-ring groove seats.

The plug and ball injector valve of this invention includes a valve housing or valve cylinder adapted for interjection into a pressurized fluid flow line. The valve cylinder extends substantially normally from the pressurized fluid line, with the cylinder including axially aligned inlet and outlet channels for communication with the pressurized fluid line. The valve cylinder also includes a loading port through which a plug or ball can be introduced into the cylinder.

A piston is arranged within the valve cylinder and is movable between a first and second position. The piston is of a sufficient length such that its forward and rearward portions never pass before the loading port as the piston is moved between its first and second positions. The forward and rearward portions of the piston are sealed against the cylinder when the piston is in its first or second position. An injection passageway extends through the piston, substantially transverse to the longitudinal axis of the piston. The injection passageway is aligned with the loading port of the cylinder when the piston is in its first position and is aligned with the inlet and outlet channels of the cylinder for the pressurized line fluid when the piston is in its second position.

An intermediate seal is disposed to act between the piston and the cylinder in the area between the loading port of the cylinder and the injection passageway of the piston when the piston is in its second position, thereby sealing the loading port area away from the pressurized line fluid communicating with the injection passageway.

An outstanding feature of the present invention resides in the disposition of a pressure balancing cavity area or space between the valve cylinder and the piston, which cavity area is brought into communication with the intermediate seal as the piston is moved between its first and second positions, thereby permitting the pressure to be equalized across the intermediate seal before that seal is exposed to an unpressurized port or passageway.

According to one aspect of the invention, the intermediate seal is disposed in an annular, generally rectangular groove about the piston with the pressure balancing cavity area formed as a counterbore in the cylinder wall immediately adjacent the loading port. In another aspect of the invention, the intermediate seal may be disposed in a groove in the cylinder wall about the piston, while the pressure balancing cavity area is formed in the piston surface adjacent the injection passageway, between the injection passageway and the forward portion of the piston. When the intermediate seal is disposed in a groove in the cylinder wall, another feature of the invention consists of a second pressure balancing cavity area formed in the piston surface adjacent the injection passageway, between the injection passageway and the rearward portion of the piston.

In the preferred embodiment, the piston includes both an injection passageway and a primary passageway, the primary passageway communicating with the inlet and outlet channels of the valve cylinder when the piston is in its first position, thereby permitting unrestricted flow of the pressurized fluid through the valve. In this embodiment, the forward and rearward end portions of the piston include first and second seals, respectively, which act to seal the piston against the cylinder. The piston is of sufficient length such that its forward end portion at all times extends past the inlet and outlet channels of the valve housing or cylinder and its rearward end portion at all times extends beyond the loading port in the valve cylinder. This arrangement prevents the seepage of the pressurized line fluid into the chamber areas at the ends of the piston during movement of the piston between its first and second positions. Consequently, there are no fluid pressures at the ends of the piston which need to be overcome to shift the piston between its first and second positions.

Another aspect of the preferred embodiment includes the arrangement of a third seal disposed in a groove about the piston between the injection passageway and the primary passageway. This third seal prevents the pressurized line fluid from entering the area of the loading port when the piston is in its first position. A fourth seal, corresponding to the intermediate seal described above, acts between the piston and cylinder and is arranged between the injection passageway of the piston and the loading port of the cylinder at the time the piston is in its second position. Accordingly, the pressurized line fluid is again sealed away from the area of the loading port.

According to another feature of the present invention, the preferred embodiment includes a drain port in the cylinder opposed to the loading port and a drain valve communicating with the drain port thereby permitting controlled evacuation of line fluid which reaches the area of the loading port during operation of the valve.

Still another feature of the invention includes the capability to arrange a retrieval cage within the injection passageway, thereby permitting the injector valve of this invention to retrieve an object such as a plug or ball from the pressurized fluid line.

Accordingly, it is the general object of the present invention to provide a new and improved ball and plug injector valve of relatively simple construction which is believed to extend the life of the seals utilized therein and which minimizes or eliminates spillage and leakage of the pressurized line fluid during operation of the injector valve.

The above and other objects and advantages of the present invention will become more apparent from a detailed description of preferred embodiments when read in conjunction with the drawings.

BRIEF DESCRIPTION OF THE DRAWINGS

In the drawings:

FIG. 2A is a cross-sectional blow up of the pipe plug depicted in FIG. 1;

FIG. 3 is a cross-sectional view of another preferred embodiment of the present invention wherein the piston is shown in its first position; and FIG. 4 is a partial cross-sectional view taken along the line 4—4 of FIG. 3 if the piston were moved to its second position.

While the invention will be described in connection with the preferred embodiments, it will be understood that it is not intended to limit the invention to those embodiments. On the contrary, it is intended to cover all alternatives, modifications and equivalents as may be included with the spirit and scope of the invention as defined by the appended claims.

DETAILED DESCRIPTION OF A PREFERRED EMBODIMENT

Figure 1:
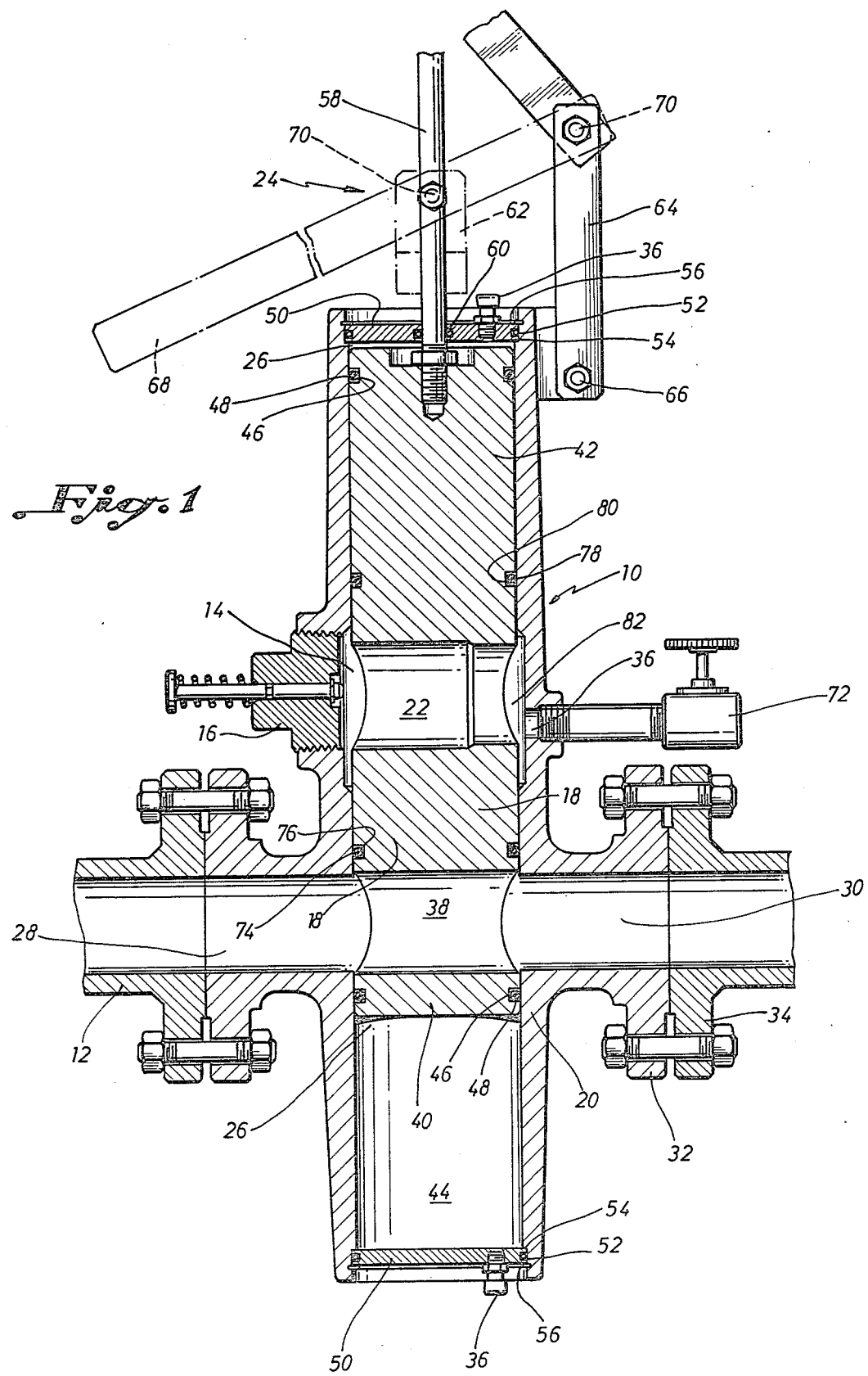
FIG. 1 is a cross-sectional view of a preferred embodiment of the injector valve of this invention shown in communication with a pipeline wherein the piston is in its first position.

Referring to FIG. 1, a plug or ball injector valve 10 is represented in a pipeline 12 which carries a pressurized fluid. The injector valve 10 is adapted to permit the introduction of solid rubber spheres or cylindrical wax plugs (not shown) into the pipeline 12 for such purposes as cleaning out pockets of liquid or separating different products being carried through the pipeline.

The injector valve 10 has a loading or injection port 14 for introduction of a plug or ball into the valve, which port may be closed by a standard pipe plug 16. The injector valve 10 forms a cylinder 20 which has a piston 18 disposed therein. The piston 18 includes an injection passageway 22 moveable into communication with either the loading port 14 or the pressurized fluid line 12 by means of a hand-operated lever mechanism 24.

More particularly, the injector valve 10 is shown to include a housing or cylinder 20 which defines a chamber 26 extending substantially normal to the pressurized fluid line 12 into which the injector valve is introduced. The cylinder 20 also defines an axially aligned inlet channel 28 and outlet channel 30 for communication with the pressurized fluid line 12. Flanges 32 are provided on the injector valve 10 about the inlet and outlet channels, which flanges may be secured in any appropriate manner, such as by bolts (not shown), to corresponding flanges 34 on the pressurized fluid line 12.

The valve cylinder 20 further defines an injection or loading port 14 which permits the introduction of a plug or ball into the cylinder. A drain port 36 is structurally positioned opposite the loading port 14, for the purpose of providing an evacuation channel for line fluid reaching the vicinity of the loading port 14.

A piston 18, which is reciprocally movable between a first and second position, is mounted within the valve cylinder 20. In the preferred embodiment, the piston 18 is provided with two passageways extending substantially transverse to the longitudinal axis of the piston. In the embodiment shown in FIG. 1, the rearward passageway operates as an injection passageway 22, while the forward or lower passageway, hereinafter identified as the primary passageway 38, functions to permit the pressurized line fluid to pass unimpeded through the injector valve 20 of this invention when the piston 20 is in its first position, as shown.

The injection passageway 22 and the primary passageway 38 are positioned in the piston 18, so that the injection passageway 22 is aligned with the loading port 14 of the cylinder and the primary passageway 38 is aligned with the pressurized fluid line 12 when the piston is in its first position. When the piston 18 is reciprocated to its second position, the injection passageway 22 is aligned with the pressurized fluid line 12. In this second position, the primary passageway 38 is blocked by the cylinder walls.

Figure 2:
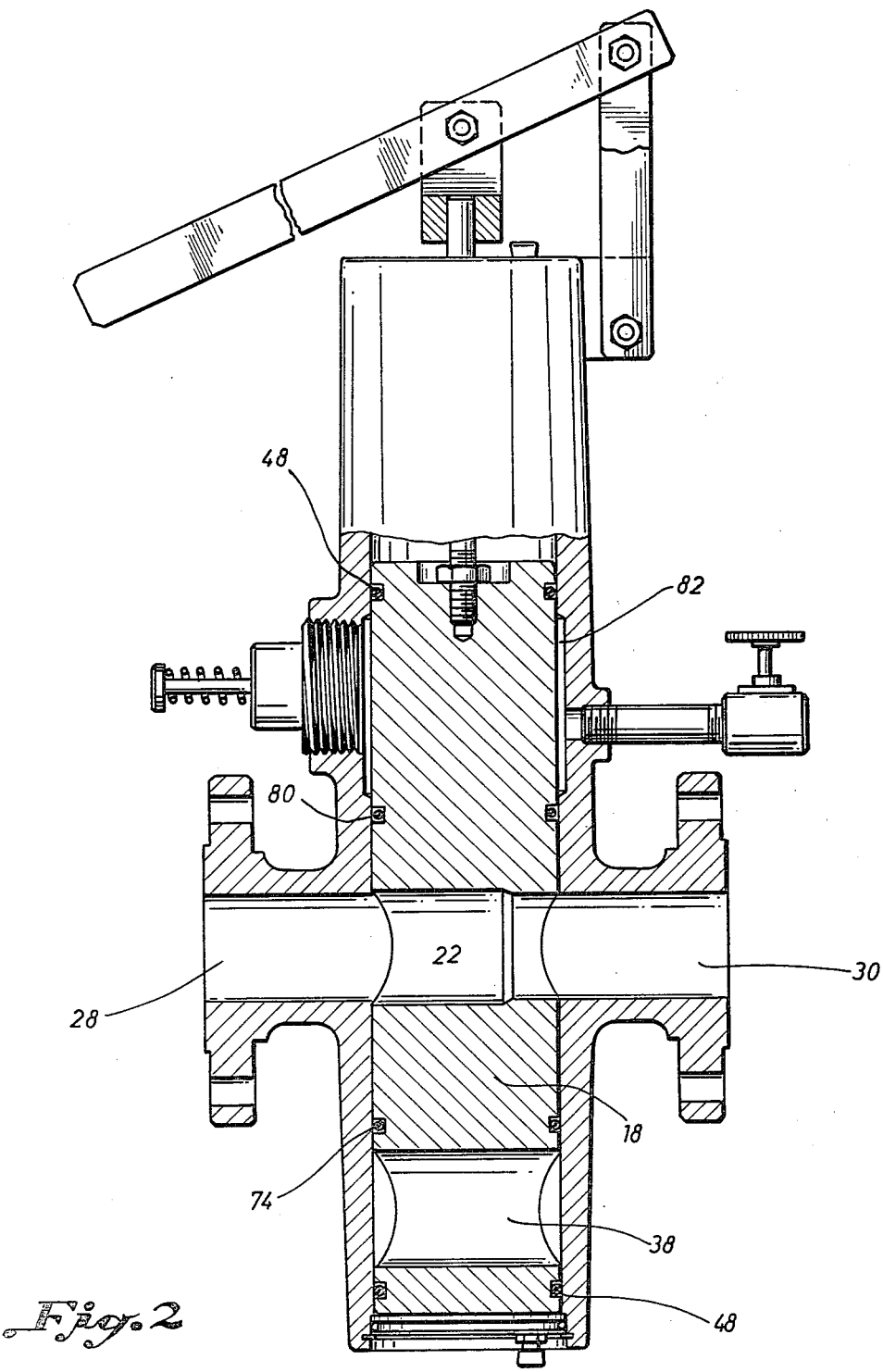
FIG. 2 is a cross-sectional view of the embodiment shown in FIG. 1 wherein the piston is in its second position.

In the preferred embodiment, the piston 18 is of sufficient length that its forward, or lower end portion 40 is never brought past the inlet 28 and outlet 30 channels of the valve cylinder. Therefore, when the piston is in its first, or raised position, the forward portion 40 of the piston extends into a segment area 44 of the chamber 26 below the pressurized fluid line 12. The length of the piston 18 is also such that when the piston is in its second position, as seen in FIG. 2, the rearward, or upper end portion 42 of the piston remains above the loading port 14 of the cylinder. Grooves 46 are formed in the forward and rearward portions of the piston 18 for purposes of carrying O-ring seals 48. These O-rings 48 seal the piston 18 against the cylinder walls at all times, thereby preventing seepage of line fluid into the areas of the chamber 26 forward and rearward of the piston 18.

The upper and lower ends of the valve cylinder 20 are provided with metal covers 50 which are sealed against the cylinder, thereby precluding rain, splash or other residue from collecting in the forward and rearward areas of the chamber 26. O-ring seals 52 may be disposed about the circumference of the covers 50 to effect sealing of the covers against the cylinder. As shown in FIGS. 1 and 2, the metal covers may be inserted into the valve cylinder 20 against flanges 54, formed by counterboring the end portions of the valve cylinder 20, and then secured against those flanges 54 with retainer rings 56.

As noted, the sealing of the forward and rearward portions of the piston 18 against the cylinder walls prevents seepage of line fluid into the end portions of the chamber 26. Seepage of fluid into the end portions of the chamber could create unbalanced pressure loads which would have to be overcome to permit complete reciprocation of the piston. Additionally, the metal covers 50 are provided with standard air vents 57 to further prevent pressure build up in the chamber end spaces which might retard or inhibit reciprocation of the piston.

The piston may be reciprocated between its first and second positions in any known manner. In the preferred embodiment depicted in FIG. 1, a hand lever mechanism 24 is shown. A piston rod 58 is secured to the piston 18 with a weld, or bolts or simply by threading the piston rod 58 directly into the piston. The piston rod 58 is extended through a central opening in the metal cover 50, which cover carries a rod seal 60 acting between the piston rod and the metal cover. A clevis 62 is mounted to the exposed end of the piston rod 58. A link member 64 is pivotally attached to a flange 65 on the outside surface of the injector valve 10, such as by a pin 66. A lever handle 68 is then pivotally attached to both the clevis 62 and the link member 64 with appropriate pin elements 70. Upward or downward movement of the lever handle 68 thereby causes reciprocation of the piston 18 between its first and second positions.

As previously explained, the valve cylinder 20 includes a loading port 14 which gives access to the inside of the cylinder 20, and specifically to the injection passageway 22 of the piston, when the piston is in its first position. The loading port 14 is closed by the pipe plug 16 which is threadably secured into the valve cylinder 20. Opposed to the loading port 14 in the valve cylinder 20 is a drain port 36 for purposes of disposing or removing line fluid which seeps into or is brought into the area of the loading port. A drain valve 72, such as a ½ NPT valve, communicates with the drain port 36 allowing the line fluid to be vented or distributed to an appropriate reservoir (not shown). Consequently, the drainage is controlled and spillage from the loading port eliminated during operation of the injection valve of this invention.

In one form of the preferred embodiment, as illustrated by FIGS. 1 and 2, the seals between the piston 18 and the cylinder 20 are all disposed in generally rectangular grooves formed about the circumference of the piston 18. This arrangement is preferable for high pressure situations such as where ANSI Class 900 valve designs would be used. Specifically, O-ring seals 48 are arranged in the grooves 46 about the forward portion 40 and rearward portion 42 of the piston 18, which seals 48 never cross an open port or passageway. A third O-ring seal 74 is disposed in a generally rectangular groove 76, formed in the piston 18 immediately above the primary passageway 38. This third seal 74 serves to keep the pressurized line fluid away from the loading port 14 and the drain port 36 when the piston 18 is in its first position, as depicted in FIG. 1.

A fourth O-ring seal 78 is arranged in a generally rectangular groove 80 about the piston 18 above the injection passageway 22. When the piston is in its first position, the seal 78 acts against the cylinder wall above the loading port 14. When the piston is in its second position, as depicted in FIG. 2, seal 78 acts against the cylinder wall in the area between the loading port 14 and the inlet 28 and outlet 30 channels for the pressurized fluid line. Consequently, when the piston is in its second position and the injection passageway 22 is aligned with the pressurized fluid line 12, the loading port 14 area remains sealed from the pressurized fluid line, generally precluding seepage or leaks through the loading port. The line fluid which reaches the area of the loading port 14 during the reciprocation of the piston between its first and second positions may be evacuated through the drain port 36 and drain valve 72.

An outstanding feature of the present invention, as depicted in FIGS. 1 and 2, resides in the arrangement of a pressure balancing cavity area 82 between the valve cylinder 20 and the piston 18 which is believed to minimize pinching and possible blowout of the seal 78 utilized in the valve.

The pressure balancing cavity area 82 may be formed in the wall of cylinder 20 between the loading port 14 and the inlet 28 and outlet 30 channels for the pressurized line fluid. The cavity area 82 may be formed as a counterbore in the cylinder adjacent the loading and drain ports. However, it will be appreciated that the cavity area 82 may take on other forms.

The pressure balancing cavity area 82 serves to balance the pressure across the intermediate or fourth seal 78 disposed in the groove 80 before that seal is brought past the loading port 14 as the piston is moved from its second position back to its first position. When the piston 18 is in its second position, the fourth seal 78 is subject to the pressurized line fluid acting against its "lower" or forward side. The rearward side of the seal 78 is subject to a low pressure inasmuch as pressurized fluid in the area about the loading port 14 and drain port 36 will be vented through the drain port 36 and drain valve 72. As a result, a compression of the fourth seal 78 toward the loading port 14 side of its groove 80 occurs. As the piston 18 is reciprocated from its second position back to its first position, there would be an urging of the fourth seal 78 toward the low pressure area and, possibly, the potential for the seal to blowout of its groove 80 when suddenly exposed to the open, unpressurized area surrounding the loading port 14. However, in the present invention, the pressure balancing cavity area 82 is of a sufficient depth, such as 1/16 of an inch, to permit a break between the seal 78 and the cylinder wall which allows the pressure to balance across the seal. At the same time, the depth of the cavity area 82 is not large enough to permit the seal 78 to be blown out of its groove 80. The pressure across the seal 78 within its groove 80 will thus be balanced as the seal 78 is moved into the loading port area.

The plug and ball injector valve 10 of this invention would normally have the piston 18 resting in its first position such that the primary passageway 38 through the piston is in communication with the inlet 28 and outlet 30 channels of the cylinder 20 and the pressurized fluid line 12. The O-ring seal 48 and O-ring seal 74 adjacent the primary passageway 38 prevent the pressurized line fluid from seeping into the lower segment area 44 of the chamber 26 of the cylinder or into the vicinity of the loading port 14 and drain port 36. Line fluid which has managed to seep or move into the vicinity of the loading port 14 during movement of the piston 18 between its second and first position is disposed of through the drain port 36 and drain valve 72. Therefore, when the piston 18 is in its first position, the pipe plug 16 can be removed without any resulting spillage or leakage of the pressurized line fluid.

When the piston 18 is in its first position, a plug or ball may be inserted through the loading port 14 and into the injection passageway 22. The pipe plug 16 is replaced and the lever arm 68 displaced downwardly to move the piston from its first position to its second position. In the second position, the injection passageway 22 is aligned with the inlet 28 and outlet 30 channels for the pressurized line fluid and the pressurized line fluid forces the plug or ball out of the injection passageway and into the main fluid line to perform its intended function.

For purposes of retrieving a plug or ball from the fluid line, the injection passageway 22 may be provided with a cage element 84 as depicted in FIG. 3. The cage element may be of any appropriate construction which allows passage or permeation of the line fluid through the cage, but not the plug or ball. It will be appreciated that the cage 84 may be secured within the injection passageway 22 in any one of a number of ways which would be known in the art. For example, the cage 84 may be held against a shoulder 86 in the injection passageway by a retainer ring 88 arranged in an annular groove 90 in the injection passageway wall. When the piston is then moved to its second position, the cage 84 is placed in direct communication with the pressurized fluid line for purposes of entrapping the plug or ball as it passes through the valve of this invention.

The pipe plug 16 used in the preferred embodiment, as best seen in FIG. 2A, is provided with a ball detector 92 mounted in a central bore 94 through the pipe plug. The ball detector 92 consists of a shaft 93 extending from the base 95 of the pipe plug 16 to a distance outside the cap surface 97 of the pipe plug. A gripping flange 99 is formed at the outside end of the shaft 93. A spring 96 acts against the gripping flange 99 and the cap surface 97, serving to bias the ball detector 92 in a withdrawn position. A retainer ring 98 mounted to the foot of the shaft 93 prevents the total withdrawal of the shaft from the pipe plug. A sealing arrangement, such as an O-ring seal 100 mounted in a groove in the shaft 93 and acting against the bore surface 94 of the pipe plug, prevents leakage through the pipe plug.

In operation, the ball detector 92 allows the user to determine whether or not a ball or plug has been collected in the cage 84 without having to remove the pipe plug from the valve. Simply, if the ball detector 92 can be fully depressed, a plug or ball has not yet been retrieved and the user may simply move the lever arm 68 to translate the piston 18 back to its second position placing the cage 84 in communication with the pressurized fluid line.

Another form of the preferred embodiment appropriate for use in lower pressure situations, such as where ANSI Class 150 valve designs would be used, is depicted in FIGS. 3 and 4. In this embodiment the intermediate seal, or fourth seal 102, resides in a groove 104 in the wall of the cylinder 20 immediately below and adjacent to the loading port 14 and drain port 36. In this arrangement, a seal disposed about the piston 18 immediately above the injection passageway 22 is not necessary. A pressure balancing cavity area 106 is formed in the piston 18 as one or more grooves or slots 106 arranged about the circumference of the piston 18 and extending substantially parallel to the longitudinal axis of the piston. As best seen in FIG. 4, such grooves 106 are generally located about the piston so as to longitudinally extend between a plane, denoted as a-a, normal to the longitudinal axis of piston 18 and falling between the injection passageway 22 and the primary passageway 38 and a plane, denoted as b-b, again normal to the piston axis, which plane would intersect the injection passageway 22.

For the embodiment depicted in FIG. 3, the fourth seal 102 will be exposed to an unpressurized area or passageway after a plug or ball has been loaded into the injection passageway 22 and movement of the piston 18 and injection passageway 22 toward the pressurized fluid line 12 is initiated. The pressure balancing cavity area 106 is extended longitudinally along the surface of piston 18 far enough such that when the seal 74 immediately above the primary passageway 38 is moved into the inlet 28 and outlet 30 channel areas and pressurized fluid is allowed to move toward the fourth seal 106, the pressure will pass over or balance across that seal, thus minimizing the tendency for a blowout of the seal as the injection passageway 22 passes over it.

Referring again to FIGS. 3 and 4, additional pressure balancing cavity areas 108, in the form of one or more longitudinally extending slots or grooves in the surface of the piston 18, are provided above the injection passageway 22 such that when the piston 18 is moved from its second position to its first position, pressure across the fourth seal 102 is again balanced. This reduces the pinching action of seal 102 toward the unpressurized loading port 14 area of the cylinder, thus reducing wear and damage to the seal 102.

It thus will be appreciated that a new and improved plug and ball injector valve has been described which eliminates or significantly reduces leakage or spillage of the pressurized fluid line during the operations of introducing or retrieving a plug or ball from the line fluid. Further, maintenance of the plug and ball injector valve is reduced and the life of the seals is increased by avoidance of sudden exposure of the seals to unpressurized ports and by reducing the period during movement of the piston when the intermediate seal is subject to a severe pressure differential which results in pinching, cutting and damage to the seal. Inasmuch as the seals of this injector valve may be situated in standard annular grooves rather than dovetail type grooves, machining of the parts for this valve is also facilitated.

Although the preferred embodiments have been described in a fair amount of detail, it is understood that such detail has been for purposes of clarification only. Various modifications and changes will be apparent to one having ordinary skill in the art without departing from the spirit and scope of the invention as hereinafter set forth in the claims.

What is claimed is:

1. A plug and ball injector valve comprising:
a valve cylinder for insertion into a pressurized fluid line, which cylinder extends substantially normal to the pressurized fluid line and which cylinder defines axially aligned inlet and outlet channels for the pressurized fluid and a loading port for the introduction of a plug or ball into the cylinder;
a piston movable between a first and a second position within the valve cylinder, said piston having forward and rearward portions which do not pass before the loading port during movement of the piston between its first and second positions and said piston having its forward and rearward portions sealed against the cylinder when the piston is in the first or second position;
an injection passageway extending through the piston, the injection passageway being aligned with the loading port of the cylinder when the piston is in its first position and aligned with the inlet and outlet channels of the cylinder for the pressurized fluid when the piston is in its second position;
an intermediate seal disposed about the piston between the loading port and the injection passageway when the piston is in its second position; and
a pressure balancing cavity area between the valve cylinder and the piston which is brought into communication with the intermediate seal as the piston is moved between its first and second positions.

2. The plug and ball injector valve of claim 1 wherein the intermediate seal is disposed in a groove in the piston and the pressure balancing cavity area is formed in the cylinder between the loading port and the inlet and outlet channels for the pressurized fluid.

3. The plug and ball injector valve of claim 2 wherein the pressure balancing cavity area is comprised of a counterbore in the cylinder wall immediately adjacent the loading port.

4. The plug and ball injector valve of claim 1 wherein the intermediate seal is disposed in a groove in the cylinder about the piston and the pressure balancing cavity area is formed in the piston adjacent the injection passageway and between the injection passageway and the forward portion of the piston.

5. The plug and ball injector valve of claim 4 wherein the pressure balancing cavity area in the piston consists of a slot in the piston extending longitudinally along the piston surface.

6. The plug and ball injector valve of claim 4 further comprising a second pressure balancing cavity area formed in the piston adjacent the injection passageway and between the injection passageway and the rearward portion of the piston.

7. The plug and ball injector valve of claim 6 wherein the second pressure balancing cavity area in the piston consists of a slot in the piston extending longitudinally along the piston surface.

8. A plug and ball injector valve comprising:
a housing having an inlet and outlet channel;
a chamber within the housing extending substantially normal to the inlet and outlet channels;
a loading port in the housing communicating with the chamber;
a piston movable within the chamber between a first and second position, said piston including an injection passageway and a primary passageway extending transversely through the piston, said injection passageway communicating with the loading port and said primary passageway communicating with the inlet and outlet channels of the housing when the piston is in its first position and said injection passageway communicating with the inlet and outlet channels of the housing when the piston is in its second position;
first and second seals circumferentially disposed about the piston at each end of the piston which act to seal each end of the piston against the housing;
a third seal disposed about the piston between the injection passageway and the primary passageway, for sealing engagement between the piston and the housing;
a fourth seal disposed about the piston between the injection passageway and the loading port when the piston is in its second position, the fourth seal sealingly engaging the piston and housing;
a means for moving the piston between its first and second positions; and
a pressure balancing cavity area formed between the piston and the housing, said cavity area coming into communication with the fourth seal during movement of the piston between its first and second positions.

9. The plug and ball injector valve of claim 8 wherein the fourth seal is disposed in a groove about the piston and the pressure balancing cavity area is formed in the housing between the loading port and the inlet and outlet channels.

10. The plug and ball injector valve of claim 9 wherein the pressure balancing cavity area is comprised of a counterbore in the housing.

11. The plug and ball injector valve of claim 8 wherein the fourth seal is disposed in a groove in the housing about the piston and the pressure balancing cavity area is formed in the piston adjacent the injection passageway between the injection passageway and the primary passageway.

12. The plug and ball injector valve of claim 11 wherein the pressure balancing cavity area is comprised of a slot in the piston which extends in a direction transverse to the injection passageway.

13. The plug and ball injector valve of claim 11 further comprising a second pressure balancing cavity area formed in the piston adjacent that portion of the injection passageway which is farthest removed from the primary passageway.

14. The plug and ball injector valve of claim 13 wherein the second pressure balancing cavity area is comprised of a slot formed in the piston surface, which slot extends substantially transversely from the injection passageway.

15. The plug and ball injector valve of claim 8 further comprising a drain port in the housing substantially opposed to the loading port and a drain valve communicating with the drain port.

16. The plug and ball injector valve of claim 8 further comprising a retrieval cage mounted in the injection passageway.

17. The plug and ball injector valve of claim 8 further comprising vents in the housing at each end of the chamber.

18. The plug and ball injector valve of claim 8 wherein the loading port is closed by a pipe plug having a detection mechanism.

* * * * *